US012673878B2

(12) United States Patent
Kezuka

(10) Patent No.: US 12,673,878 B2
(45) Date of Patent: Jul. 7, 2026

(54) METHOD FOR PRODUCING CALCIUM CARBONATE, CALCIUM CARBONATE, AND METHOD FOR GROWING CALCIUM CARBONATE CRYSTALS

(71) Applicant: SHIRAISHI CENTRAL LABORATORIES Co., Ltd., Amagasaki City (JP)

(72) Inventor: Yuki Kezuka, Amagasaki City (JP)

(73) Assignee: SHIRAISHI CENTRAL LABORATORIES CO. LTD., Amagasaki City (JP)

( * ) Notice: Subject to any disclaimer, the term of this patent is extended or adjusted under 35 U.S.C. 154(b) by 0 days.

(21) Appl. No.: 17/544,361

(22) Filed: Dec. 7, 2021

(65) Prior Publication Data

US 2022/0194807 A1     Jun. 23, 2022

(30) Foreign Application Priority Data

Dec. 22, 2020     (JP) ................................. 2020-212035

(51) Int. Cl.
*C01F 11/18* (2006.01)

(52) U.S. Cl.
CPC .......... *C01F 11/18* (2013.01); *C01P 2004/64* (2013.01); *C01P 2006/12* (2013.01)

(58) Field of Classification Search
CPC .... C01F 11/18; C01P 2004/64; C01P 2006/12
See application file for complete search history.

(56) References Cited

U.S. PATENT DOCUMENTS 5,215,734 A * 6/1993 Kunesh .................. D21H 21/52
423/430

FOREIGN PATENT DOCUMENTS

JP      2000-159974 A      6/2000
JP      2000-350920 A      12/2000

JP      2013-203581 A      10/2013
JP      2017-500270 A      1/2017
JP      2018-510108 A      4/2018

OTHER PUBLICATIONS

Extended European Search Report dated May 9, 2022, issued in counterpart application No. 21206943.9. (9 pages).
Erdogan, N. et al.; "Precipitated Calcium Carbonate Production, Synthesis and Properties", Physicochem. Probl. Miner. Process., vol. 53, No. 1, Jan. 1, 2017, pp. 57-68, cited in EESR dated May 9, 2022.
Jimoh, O. et al.; "Understanding the Precipitated Calcium Carbonate (PCC) Production Mechanism and Its Characteristics in the Liquid-Gas System Using Milk of Lime (MOL) Suspension", S. Afr. J. Chem., vol. 70, Jan. 1, 2017, pp. 1-7, cited in EESR dated May 9, 2022.
Bayoumi, R. A. et al.; "Nano Calcium Carbonate Production Utilizing Solvay-Process Industrial Wastewater and Carbon Dioxide", Key Engineering Materials, vol. 821, Sep. 1, 2019, pp. 350-358, cited in EESR dated May 9, 2022.
Teir, S. et al.; "Production of precipitated calcium carbonate from calcium silicates and carbon dioxide", Energy Conversion and Management, vol. 46, No. 18-19, Nov. 1, 2005, pp. 2954-2979, cited in EESR dated May 5, 2022.
Altiner, M. et al.; "Production of Precipitated Calcium Carbonate Particles with Different Morphologies from Dolomite Ore in the Presence of Various Hydroxide Additives", Physicochem. Probl. Miner. Process., vol. 53, No. 1, Jan. 1, 2017, pp. 413-426, cited in EESR dated May 9, 2022.
Kezuka et al., "Template-free fabrication of single-crystalline calcite nanorings during crystal growth in water", The Royal Society of Chemistry, CrystEngComm, (2020), 22, pp. 9-13. Cited in Specification. (5 pages).
Notice of Reasons for Refusal dated Apr. 27, 2021, issued in counterpart of Japanese Patent Application No. 2020-212035, with English Translation (9 pages).

* cited by examiner

*Primary Examiner* — Stuart L Hendrickson
(74) *Attorney, Agent, or Firm* — WHDA, LLP

(57)     ABSTRACT

Provided are a method for producing calcium carbonate having a controlled size and a method for growing crystals in order to produce calcium carbonate having a controlled size. A method for producing a calcium carbonate comprises the steps of reducing the pH of an aqueous calcium carbonate dispersion to 9.0 or less and then increasing the pH of the aqueous calcium carbonate dispersion to grow calcium carbonate particles.

6 Claims, 7 Drawing Sheets

FIG. 1-a
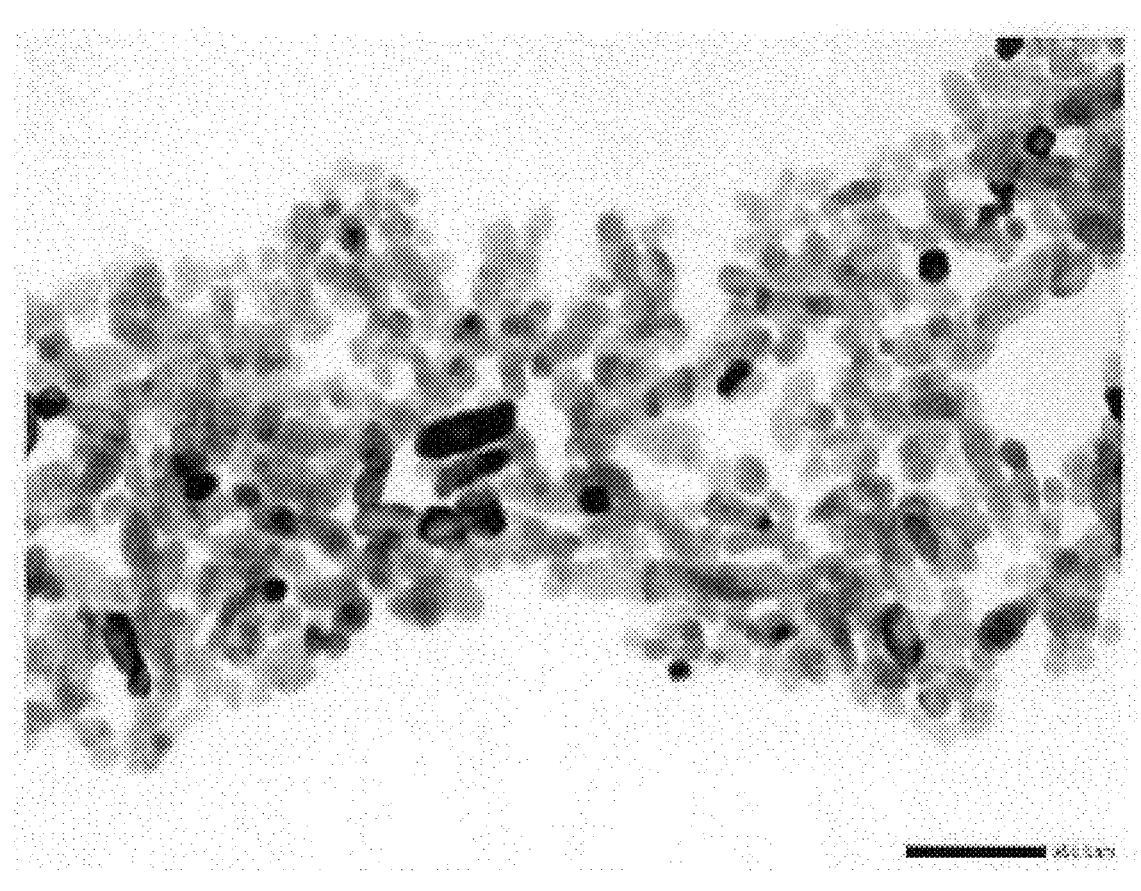

FIG. 1-b
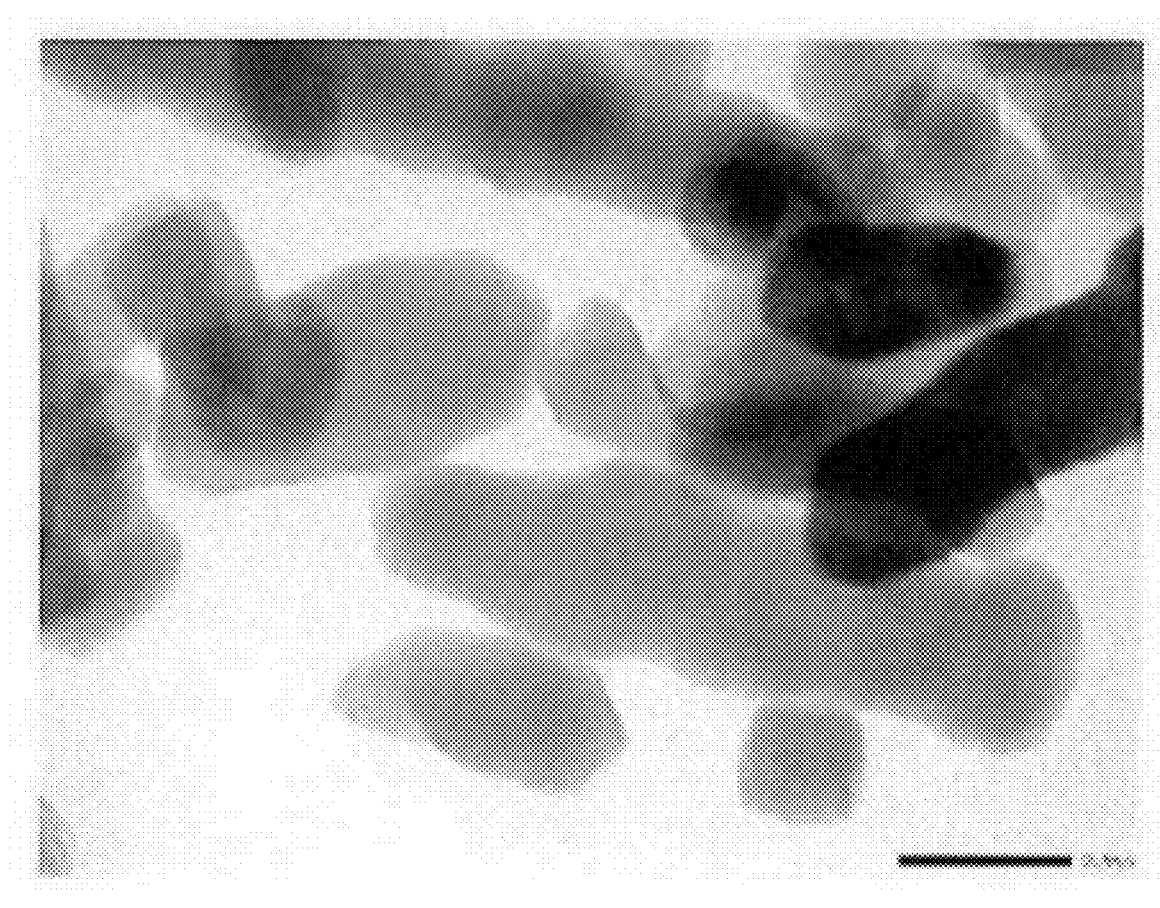

FIG. 2-a
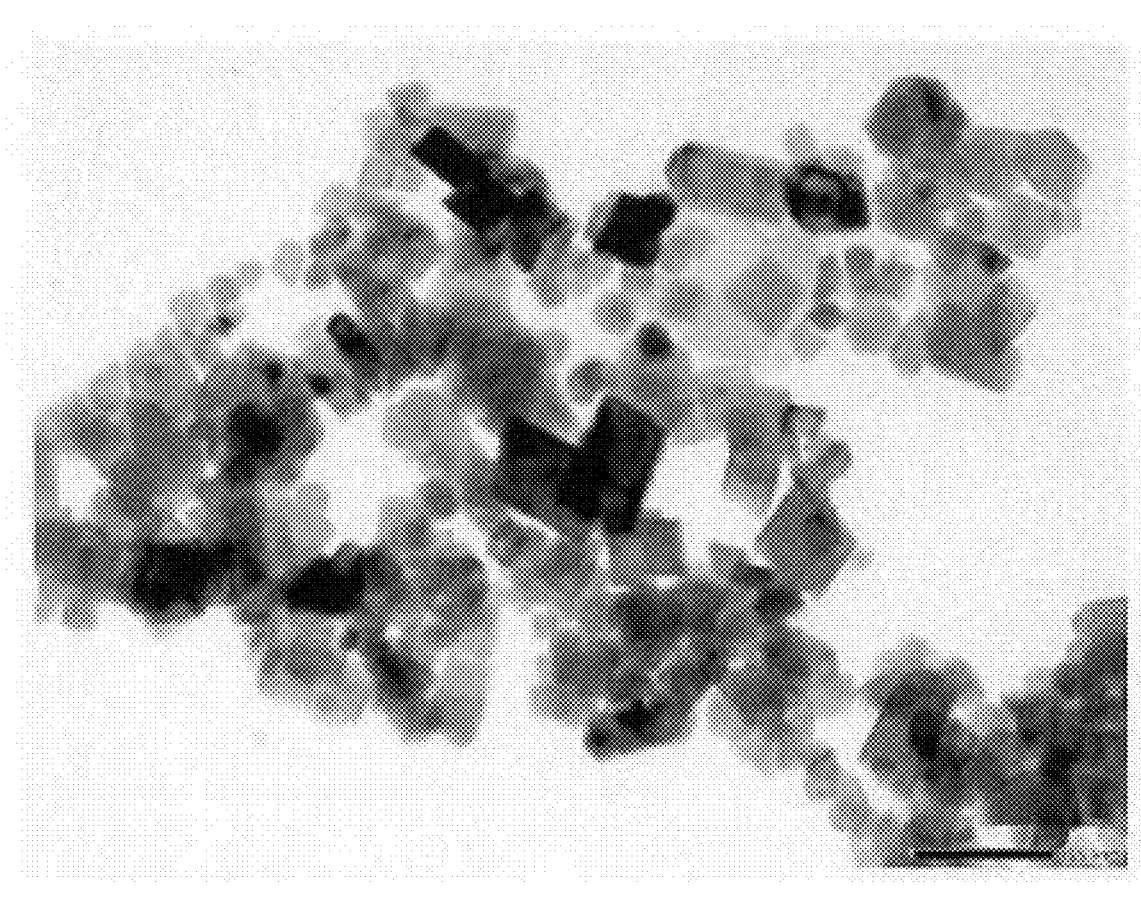

FIG. 2-b
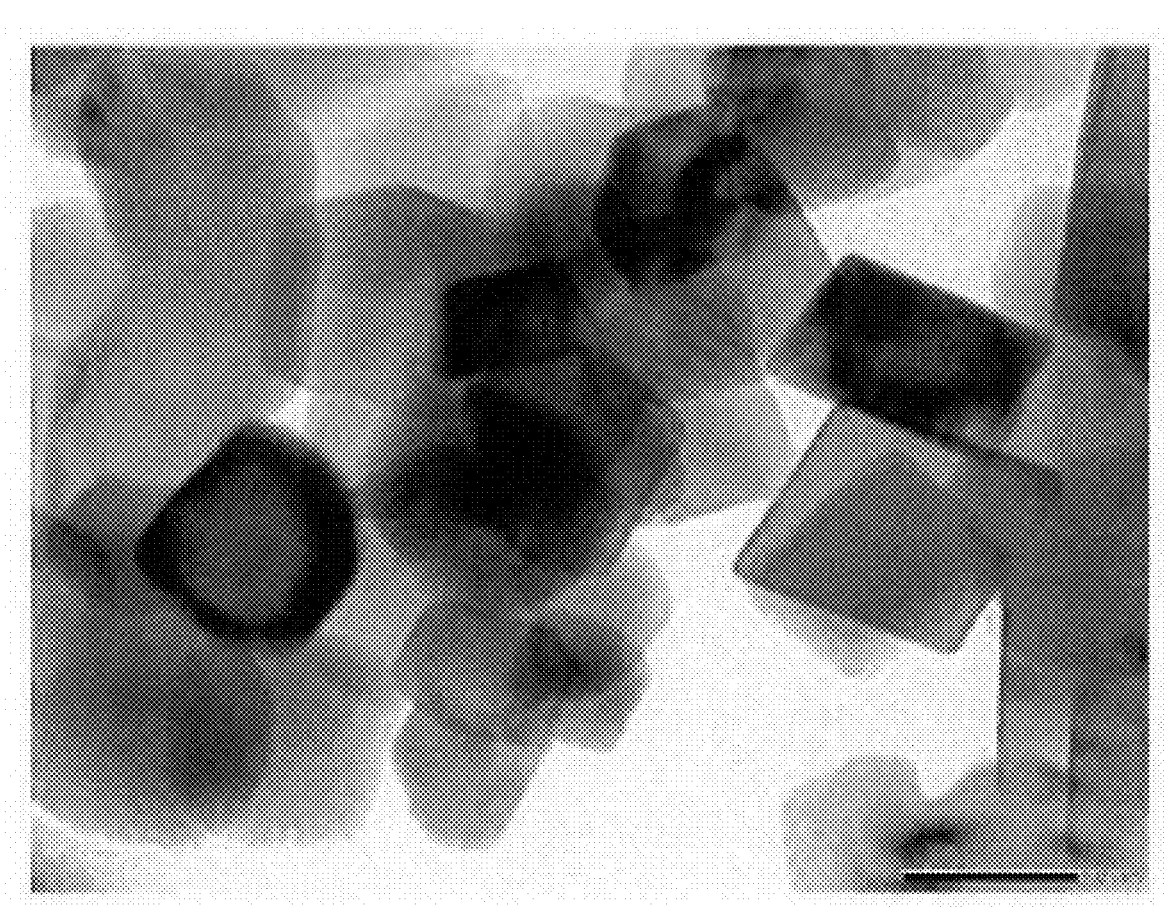

1

METHOD FOR PRODUCING CALCIUM CARBONATE, CALCIUM CARBONATE, AND METHOD FOR GROWING CALCIUM CARBONATE CRYSTALS

BACKGROUND

1. Technical Field

The present invention relates to a method for producing calcium carbonate and a method for growing calcium carbonate crystals.

2. Description of the Background

Calcium carbonate ($CaCO_3$) is widely used as a base material or a loading material of various industrial products and is also widely used in the fields of agriculture and food. Calcium carbonate is produced by blowing carbon dioxide into an aqueous calcium hydroxide solution or by mixing an aqueous solution of a soluble calcium salt such as calcium chloride with an aqueous solution of a soluble carbonate such as sodium carbonate. The Shiraishi method has been widely known. In the method, limestone ($CaCO_3$) is subjected to calcination and decarbonation to give quick lime (CaO), which is reacted with water to give lime milk (aqueous suspension of $CaOH_2$), then carbon dioxide obtained in the calcination is blown into the lime milk to give calcium carbonate in a liquid phase.

Calcium carbonate is applied mainly as an inorganic filler, for example, in paper, rubber, sealing materials, and plastics. For example, calcium carbonate filled in paper can improve the brightness or opacity of the paper, and calcium carbonate added to rubber can improve the mechanical strength and abrasion resistance of the rubber. Calcium carbonate added to a sealing material can control the viscosity and thixotropy of the sealing material, and calcium carbonate added to a plastic can improve the mechanical strength of the plastic or can control the thermal properties of the plastic. To separately produce calcium carbonates each having an intended particle size or an intended crystal shape depending on applications, various studies have been conducted. Calcium carbonate has crystalline polymorphs such as calcite crystals, aragonite crystals, and vaterite crystals, and methods of separately producing these crystals have also been disclosed. For example, Patent Document 1 discloses a method for producing aragonite calcium carbonate. Patent Document 2 discloses a process of converting gypsum into precipitated calcium carbonate. In the process, a mixture containing gypsum and a seed, a mineral acid, or both is reacted with at least one carbonate source to directly yield precipitated calcium carbonate in the form of calcite and/or aragonite without conversion from a vaterite polymorph. Patent Document 3 discloses a method for producing nano silicon dioxide and nano calcium carbonate by using rice hull ash and flue gas of a biomass power plant.

CITATION LIST

Patent Literature

Patent Document 1: JP 2013-203581 A
Patent Document 2: JP 2018-510108 A
Patent Document 3: JP 2017-500270 A

2

Non Patent Literature

Non-Patent Document 1: The Royal Society of Chemistry CrystEngComm, 2020, 22, pp 9-13

BRIEF SUMMARY

In the conventionally known method for producing calcium carbonate by blowing carbon dioxide into an aqueous calcium hydroxide solution, the amount of carbon dioxide dissolved at atmospheric pressure is limited, and accordingly the grown crystals have a limited size. Patent Documents 1, 2, and 3 also disclose various methods for producing calcium carbonates having different particle sizes or different crystal shapes. Even with these techniques, it is still difficult to efficiently produce a calcium carbonate having a large size or to produce a calcium carbonate having an intended size. Non-Patent Document 1 discloses a method of facilitating crystal growth of calcium carbonate by adding carbon dioxide to an aqueous calcium carbonate dispersion at atmospheric pressure and then heating the mixture. The method according to Non-Patent Document 1 enables growth of calcium carbonate particles having a relatively uniform size. Even in the method, the amount of carbon dioxide dissolved is limited, and accordingly the grown crystals have a limited size, unfortunately, as with the above method of blowing carbon dioxide into an aqueous calcium hydroxide solution.

The present invention is therefore intended to provide a method for producing a calcium carbonate having a controlled size. The present invention is further intended to provide a method for growing crystals in order to produce a calcium carbonate having a controlled size.

One of the present inventions is a method for producing a calcium carbonate, the method comprising the steps of:

reducing a pH of an aqueous calcium carbonate dispersion to 9.0 or less; and then increasing the pH of the aqueous calcium carbonate dispersion to grow calcium carbonate particles.

Further, another invention is a calcium carbonate produced by the above-described production method, having a calcite structure, having a BET specific surface area of 2 to 50 $m^2$/g, and having a number-based average particle size of 30 nm to 1.0 μm as determined by electron microscopy.

The present invention relates to a method for growing calcium carbonate crystals, the method comprising the steps of:

reducing a pH of an aqueous calcium carbonate dispersion to 9.0 or less; and then increasing the pH of the aqueous calcium carbonate dispersion to grow calcium carbonate particles.

According to the present invention, a novel method for efficiently producing a calcium carbonate having a relatively large size and a novel crystal growth method can be provided.

BRIEF DESCRIPTION OF DRAWINGS

FIG. 1-$a$ is an electron micrograph (magnified 40,000 times) of a starting material calcium carbonate in a production method of the present invention.

FIG. 1-$b$ is an electron micrograph (magnified 200,000 times) of the starting material calcium carbonate in the production method of the present invention.

FIG. 2-*a* is an electron micrograph (magnified 40,000 times) of a calcium carbonate produced in Example 1-1.

FIG. 2-*b* is an electron micrograph (magnified 200,000 times) of the calcium carbonate produced in Example 1-1.

DETAILED DESCRIPTION

Figure 3:
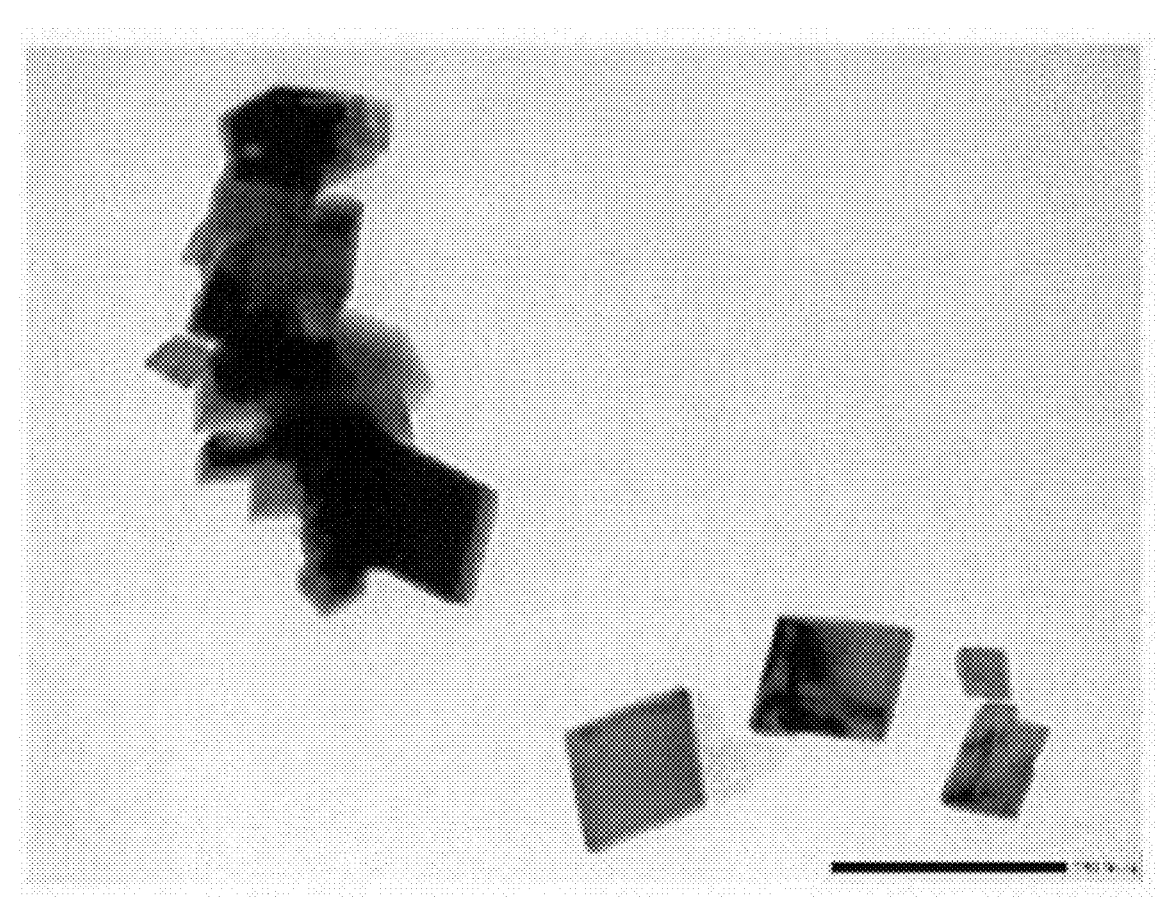
FIG. 3 is an electron micrograph (magnified 20,000 times) of a calcium carbonate produced in Example 2-2.

Embodiments of the present invention will be described in further detail, but the present invention is not intended to be limited to the following embodiments.

A first embodiment of the present invention relates to a method for producing calcium carbonate. The method comprises reducing the pH of an aqueous calcium carbonate dispersion to 9.0 or less, and then increasing the pH of the aqueous calcium carbonate dispersion to grow calcium carbonate particles. The outline of the embodiment is a method for giving a calcium carbonate having an intended shape and an intended average particle size by growing crystals from an aqueous calcium carbonate dispersion as a material, or is a production method relating to Ostwald ripening.

In the embodiment, the calcium carbonate dispersed in the aqueous calcium carbonate dispersion used as the material and the produced calcium carbonate are a carbonate of calcium that is represented by the composition formula, $CaCO_3$, and is the main component of seashells, eggshells, limestone, chalk, and the like. Calcium carbonate is classified into ground calcium carbonate (natural calcium carbonate) prepared by pulverization and classification of limestone and precipitated calcium carbonate (synthetic calcium carbonate) prepared by chemical reaction, and the calcium carbonate dispersed in the aqueous calcium carbonate dispersion used as the material in the embodiment may be either of them. The calcium carbonate may be any of polymorphs such as calcite crystals (trigonal rhombohedral crystals), aragonite crystals (orthorhombic crystals), and vaterite crystals (hexagonal crystals), but the calcite crystals of calcium carbonate are preferably used. The calcium carbonate may have any particle size (number-based average particle size as determined by electron microscopy), but a calcium carbonate preferably having a number-based average particle size of 20 to 500 nm, more preferably 30 to 100 nm, can be used. The calcium carbonate may have any BET specific surface area (JIS Z 8830, corresponding to ISO 9277:2010), but to produce a calcium carbonate having an intended BET specific surface area by the present embodiment, an aqueous calcium carbonate dispersion in which a calcium carbonate having a BET specific surface area of about 2 to 50 $m^2/g$ is dispersed in water is preferably used.

In the embodiment, first, an aqueous calcium carbonate dispersion in which calcium carbonate is dispersed in water is prepared. The aqueous calcium carbonate dispersion in the present description means a slurry in which calcium carbonate is suspended or dispersed in water. To prepare the aqueous calcium carbonate dispersion, calcium carbonate can be mixed with water, and the mixture can be appropriately stirred by a conventional method such as stirring with a stirrer and stirring by sonication. An aqueous calcium carbonate dispersion produced by the conventionally known Shiraishi method can also be used directly. After preparation of the aqueous calcium carbonate dispersion, the pH of the aqueous calcium carbonate dispersion is reduced to 9.0 or less. In the present embodiment, the pH of the aqueous calcium carbonate dispersion can be reduced, for example, by adding an acidic substance except carbon dioxide at atmospheric pressure or by adding an acidic substance at higher pressure. The pH of the aqueous calcium carbonate dispersion is preferably reduced to 9.0 or less and 5.5 or more by such a method.

Examples of the acidic substance to be added to the aqueous calcium carbonate dispersion at atmospheric pressure include inorganic acids such as carbonated water, hydrochloric acid, sulfuric acid, phosphoric acid, hydrobromic acid, and boric acid and organic acids such as benzenesulfonic acid, acetic acid, citric acid, tartaric acid, and ascorbic acid. These acidic substances may be used singly or in combination of two or more of them. The acidic substance to be added to the aqueous calcium carbonate dispersion at atmospheric pressure may be in any state of gas, liquid, and solid, and an acidic substance in the state of liquid or solid is particularly preferably added. As the acidic substance to be added to the aqueous calcium carbonate dispersion at atmospheric pressure, gaseous carbon dioxide is excluded. By adding such an acidic substance while the aqueous calcium carbonate dispersion is stirred with a stirrer or the like at atmospheric pressure, the pH of the aqueous calcium carbonate dispersion can be reduced.

Examples of the acidic substance to be added to the aqueous calcium carbonate dispersion at high pressure include inorganic acids such as carbon dioxide, carbonated water, hydrochloric acid, sulfuric acid, phosphoric acid, hydrobromic acid, and boric acid and organic acids such as benzenesulfonic acid, acetic acid, citric acid, tartaric acid, and ascorbic acid. These acidic substances may be used singly or in combination of two or more of them. The acidic substance to be added to the aqueous calcium carbonate dispersion at high pressure may be in any state of gas, liquid, and solid. When an acidic substance is added to the aqueous calcium carbonate dispersion at high pressure, gaseous carbon dioxide can also be used. The high pressure is a pressure higher than the atmospheric pressure and is specifically a pressure not less than 1 atm and less than 10 atm, preferably about 2 to 4 atm. By adding such an acidic substance while the aqueous calcium carbonate dispersion is stirred with a stirrer or the like at such a high pressure, the pH of the aqueous calcium carbonate dispersion can be reduced.

As the acidic substance is dissolved in water at atmospheric pressure or high pressure, the aqueous calcium carbonate dispersion becomes acidic. Accordingly, calcium carbonate is partially dissolved. In other words, a calcium carbonate having a relatively small particle size and contained in the aqueous calcium carbonate dispersion is at least partially dissolved in water. In contrast, at least the periphery of a calcium carbonate having a relatively large particle size is dissolved to give a calcium carbonate having a slightly smaller particle size. The pH of the aqueous calcium carbonate dispersion is more preferably so controlled as not to completely dissolve calcium carbonate in the step.

Next, the pH of the aqueous calcium carbonate dispersion is increased. To increase the pH of the aqueous calcium carbonate dispersion, the following methods can be used: the aqueous calcium carbonate dispersion is allowed to stand; the aqueous calcium carbonate dispersion is stirred; the aqueous calcium carbonate dispersion is depressurized; the aqueous calcium carbonate dispersion is heated; and a basic substance is added to the aqueous calcium carbonate dispersion. When the acidic substance added in the foregoing step is a gaseous substance such as carbon dioxide, the acidic substance gradually evaporates from the water as the aqueous calcium carbonate dispersion is simply allowed to stand, and thus the pH of the aqueous calcium carbonate dispersion increases. Even in such a case, the aqueous calcium carbonate dispersion is preferably stirred, depressurized, or heated, or a basic substance is preferably added, to more efficiently increase the pH of the aqueous calcium carbonate dispersion. When the acidic substance added to the aqueous calcium carbonate dispersion is a liquid or solid substance, the aqueous calcium carbonate dispersion is preferably stirred, depressurized, or heated, or a basic substance is preferably added to the aqueous calcium carbonate dispersion, to facilitate the increase of pH. While the aqueous calcium carbonate dispersion is gently stirred, an additional method such as depressurizing, heating, and addition of a basic substance is more preferably performed. In the case of heating, the aqueous calcium carbonate dispersion is preferably heated to a temperature higher than room temperature (25° C.), specifically to about 50° C., preferably to about 70° C., and more preferably to about 100° C. In the case of depressurizing, the aqueous calcium carbonate dispersion is preferably depressurized to a pressure less than the atmospheric pressure, specifically to a pressure of about $10^2$ to $1 \times 10^5$ Pa. Examples of the basic substance to be added to the aqueous calcium carbonate dispersion include inorganic bases such as ammonia, sodium hydroxide, magnesium hydroxide, and calcium hydroxide, organic bases such as amines and pyridines, and combinations thereof. As the pH of the aqueous calcium carbonate dispersion is increased, the calcium carbonate dissolved in the foregoing step gradually crystallizes. During the crystallization, a recrystallization phenomenon in which calcium carbonate gathers around the particles remaining in the aqueous calcium carbonate dispersion and aggregates is observed, and substantially cubic, substantially rectangular parallelepiped, or substantially rhombohedral particles are formed. In the production method in the embodiment, the step of reducing the pH of the aqueous calcium carbonate dispersion and the step of increasing the pH of the aqueous calcium carbonate dispersion can be repeated to produce a calcium carbonate having an intended BET specific surface area and/or an intended average particle size.

A second embodiment of the present invention is a calcium carbonate produced in the first embodiment. The calcium carbonate in the embodiment is a synthetic calcium carbonate produced by the production method in the first embodiment. As described above, calcium carbonate has crystalline polymorphs including calcite crystals (trigonal rhombohedral crystals), aragonite crystals (orthorhombic crystals), and vaterite crystals (hexagonal crystals), and the calcium carbonate in the embodiment preferably has the calcite structure. The calcite crystal is the form of a crystal typically produced as calcite and is most stable at normal temperature and pressure as compared with the other crystal forms. The calcium carbonate in the embodiment preferably has the calcite structure and a BET specific surface area of 2 to 50 m²/g. The BET specific surface area can be determined as follows: gas molecules (such as nitrogen molecules) having a known adsorbate occupied area are allowed to adsorb to a substance; and the adsorption amount is calculated. The BET specific surface area of a calcium carbonate can be determined in accordance with "Determination of the specific surface area of powders (solids) by gas adsorption-BET method" in JIS Z 8830 (corresponding to ISO 9277:2010). The calcium carbonate used in the embodiment preferably has a BET specific surface area of 2 to 50 m²/g, more preferably 5 to 45 m²/g, and even more preferably 20 to 45 m²/g. The calcium carbonate in the embodiment preferably has a number-based average particle size of 30 nm to 1.0 μm as determined by electron microscopy. To determine particle sizes, some methods are known. In the present embodiment, particles are directly observed and measured under an electron microscope, and an average particle size is calculated from a number-based particle size distribution. In the embodiment, a calcium carbonate having an average particle size of 30 nm to 1.0 μm means that the calcium carbonate mainly comprises calcium carbonate particles having nano-order particle sizes. The calcium carbonate in the embodiment preferably has an average particle size of 40 to 500 nm and more preferably 50 to 100 nm.

The calcium carbonate in the embodiment may partially comprise substantially ring-like particles. In the present description, the ring-like shape generally means a shape having a single pore (ring) and a shape having a cavity (hollow) and includes not only a circular shape and a ring shape but also polygonal shapes, such as a triangular shape and a quadrangular shape, each having a single pore or a cavity and a tubular shape. In the present description, the substantially ring-like shape includes not only a completely continuous ring-like shape but also an incompletely continuous ring-like shape such as a C shape. The calcium carbonate in the embodiment may partially comprise substantially ring-like particles. The substantially ring-like calcium carbonate has a size of about 10 to 150 nm. The substantially ring-like particles of calcium carbonate are formed due to the production process of calcium carbonate described later. The calcium carbonate in the embodiment may comprise, in addition to the substantially ring-like particles, particles having spherical, substantially cubic, substantially rectangular parallelepiped, substantially rhombohedral, spindle, acicular, and other shapes. The calcium carbonate in the embodiment may also comprise partially concave particles having spherical, substantially rectangular parallelepiped, and other shapes, or a shape having an incomplete pore, for example.

The calcium carbonate in the embodiment may be surface-treated with a surface treatment agent selected from the group consisting of a fatty acid and derivatives thereof, a resin acid and derivatives thereof, silica, an organic silicon compound, a condensed phosphoric acid, and a condensed phosphate. Examples of the fatty acid include lower fatty acids such as acetic acid and butyric acid and higher fatty acids such as palmitic acid, stearic acid, oleic acid, linoleic acid, linolenic acid, arachidonic acid, eicosapentaenoic acid, and docosahexaenoic acid. Examples of the resin acid include acids derived from resins, such as abietic acid, neoabietic acid, palustric acid, pimaric acid, isopimaric acid, and dehydroabietic acid. Silica is a compound (silicon dioxide) represented by the composition formula, $SiO_2$. Examples of the organic silicon compound include a silane coupling agent in which a functional group (such as a vinyl group, an epoxy group, an amino group, a methacryl group, and a mercapto group) bonded to an organic material is bonded through a silicon atom (Si) to a functional group (such as a methoxy group and an ethoxy group) bonded to an inorganic material in a molecule. Examples of the condensed phosphoric acid include an inorganic polymer compound prepared by heating dehydration of orthophosphoric acid. These surface treatment agents may be used singly or in combination of two or more of them.

A third embodiment of the present invention relates to a method for growing calcium carbonate crystals. The method comprises reducing the pH of an aqueous calcium carbonate dispersion to 9.0 or less, and then increasing the pH of the aqueous calcium carbonate dispersion to grow calcium carbonate particles. The outline of the embodiment is a method for giving a calcium carbonate having an intended shape and an intended average particle size by growing crystals from an aqueous calcium carbonate dispersion as a material, or is a crystal growth method relating to Ostwald ripening.

In the embodiment, the calcium carbonate dispersed in the aqueous calcium carbonate dispersion used as the material and the produced calcium carbonate are a carbonate of calcium that is represented by the composition formula, $CaCO_3$, and is the main component of seashells, eggshells, limestone, chalk, and the like. Calcium carbonate is classified into ground calcium carbonate (natural calcium carbonate) prepared by pulverization and classification of limestone and precipitated calcium carbonate (synthetic calcium carbonate) prepared by chemical reaction, and the calcium carbonate used as the material in the embodiment may be either of them. The calcium carbonate may be any of polymorphs such as calcite crystals (trigonal rhombohedral crystals), aragonite crystals (orthorhombic crystals), and vaterite crystals (hexagonal crystals), but the calcite crystals of calcium carbonate are preferably used. The calcium carbonate may have any particle size (number-based average particle size as determined by electron microscopy), but a calcium carbonate preferably having a number-based average particle size of 20 to 500 nm, more preferably 30 to 100 nm, can be used. The calcium carbonate may have any BET specific surface area (JIS Z 8830, corresponding to ISO 9277:2010), but to produce a calcium carbonate having an intended BET specific surface area by the present embodiment, an aqueous calcium carbonate dispersion in which a calcium carbonate having a BET specific surface area of about 2 to 50 $m^2/g$ is dispersed in water is preferably used.

In the embodiment, first, an aqueous calcium carbonate dispersion in which calcium carbonate is dispersed in water is prepared. The aqueous calcium carbonate dispersion in the present description means a slurry in which calcium carbonate is suspended or dispersed in water. To prepare the aqueous calcium carbonate dispersion, calcium carbonate can be mixed with water, and the mixture can be appropriately stirred by a conventional method such as stirring with a stirrer and stirring by sonication. An aqueous calcium carbonate dispersion produced by the conventionally known Shiraishi method can also be used directly. After preparation of the aqueous calcium carbonate dispersion, the pH of the aqueous calcium carbonate dispersion is reduced to 9.0 or less. In the present embodiment, the pH of the aqueous calcium carbonate dispersion can be reduced, for example, by adding an acidic substance except carbon dioxide at atmospheric pressure or by adding an acidic substance at higher pressure. The pH of the aqueous calcium carbonate dispersion is preferably reduced to 9.0 or less and 5.5 or more by such a method.

Examples of the acidic substance to be added to the aqueous calcium carbonate dispersion at atmospheric pressure include inorganic acids such as carbonated water, hydrochloric acid, sulfuric acid, phosphoric acid, hydrobromic acid, and boric acid and organic acids such as benzenesulfonic acid, acetic acid, citric acid, tartaric acid, and ascorbic acid. These acidic substances may be used singly or in combination of two or more of them. The acidic substance to be added to the aqueous calcium carbonate dispersion at atmospheric pressure may be in any state of gas, liquid, and solid, and an acidic substance in the state of liquid or solid is particularly preferably added. As the acidic substance to be added to the aqueous calcium carbonate dispersion at atmospheric pressure, gaseous carbon dioxide is excluded. By adding such an acidic substance while the aqueous calcium carbonate dispersion is stirred with a stirrer or the like at atmospheric pressure, the pH of the aqueous calcium carbonate dispersion can be reduced.

Examples of the acidic substance to be added to the aqueous calcium carbonate dispersion at high pressure include inorganic acids such as carbon dioxide, carbonated water, hydrochloric acid, sulfuric acid, phosphoric acid, hydrobromic acid, and boric acid and organic acids such as benzenesulfonic acid, acetic acid, citric acid, tartaric acid, and ascorbic acid. These acidic substances may be used singly or in combination of two or more of them. The acidic substance to be added to the aqueous calcium carbonate dispersion at high pressure may be in any state of gas, liquid, and solid. When an acidic substance is added to the aqueous calcium carbonate dispersion at high pressure, gaseous carbon dioxide can also be used. The high pressure is a pressure higher than the atmospheric pressure and is specifically a pressure not less than 1 atm and less than 10 atm, preferably about 2 to 4 atm. By adding such an acidic substance while the aqueous calcium carbonate dispersion is stirred with a stirrer or the like at such a high pressure, the pH of the aqueous calcium carbonate dispersion can be reduced.

As the acidic substance is dissolved in water at atmospheric pressure or high pressure, and the aqueous calcium carbonate dispersion becomes acidic. Accordingly, calcium carbonate is partially dissolved. In other words, a calcium carbonate having a relatively small particle size and contained in the aqueous calcium carbonate dispersion is at least partially dissolved in water. In contrast, at least the periphery of a calcium carbonate having a relatively large particle size is dissolved to give a calcium carbonate having a slightly smaller particle size. The pH of the aqueous calcium carbonate dispersion is preferably so controlled as not to completely dissolve calcium carbonate in the step.

Next, the pH of the aqueous calcium carbonate dispersion is increased. To increase the pH of the aqueous calcium carbonate dispersion, the following methods can be used: the aqueous calcium carbonate dispersion is allowed to stand; the aqueous calcium carbonate dispersion is stirred; the aqueous calcium carbonate dispersion is depressurized; the aqueous calcium carbonate dispersion is heated; and a basic substance is added to the aqueous calcium carbonate dispersion. When the acidic substance added in the foregoing step is a gaseous substance such as carbon dioxide, the acidic substance gradually evaporates from the water as the aqueous calcium carbonate dispersion is simply allowed to stand, and thus the pH of the aqueous calcium carbonate dispersion increases. Even in such a case, the aqueous calcium carbonate dispersion is preferably stirred, depressurized, or heated, or a basic substance is preferably added, to more efficiently increase the pH of the aqueous calcium carbonate dispersion. When the acidic substance added to the aqueous calcium carbonate dispersion is a liquid or solid substance, the aqueous calcium carbonate dispersion is preferably stirred, depressurized, or heated, or a basic substance is preferably added to the aqueous calcium carbonate dispersion, to facilitate the increase of pH. While the aqueous calcium carbonate dispersion is gently stirred, an additional method such as depressurizing, heating, and addition of a basic substance is more preferably performed. In the case of heating, the aqueous calcium carbonate dispersion is preferably heated to a temperature higher than room temperature (25° C.), specifically to about 50° C., preferably to about 70° C., and more preferably to about 100° C. In the case of depressurizing, the aqueous calcium carbonate dispersion is preferably depressurized to a pressure less than the atmospheric pressure, specifically to a pressure of about $10^2$ to $1 \times 10^5$ Pa. Examples of the basic substance to be added to the aqueous calcium carbonate dispersion include inorganic bases such as ammonia, sodium hydroxide, magnesium hydroxide, and calcium hydroxide, organic bases such as amines and pyridines, and combinations thereof. As the pH of the aqueous calcium carbonate dispersion is increased, the calcium carbonate dissolved in the foregoing step gradually crystallizes. During the crystallization, a recrystallization phenomenon in which calcium carbonate gathers around the particles remaining in the aqueous calcium carbonate dispersion and aggregates is observed, and substantially cubic, substantially rectangular parallelepiped, or substantially rhombohedral particles are formed. In the crystal growth method in the embodiment, the step of reducing the pH of the aqueous calcium carbonate dispersion and the step of increasing the pH of the aqueous calcium carbonate dispersion can be repeated to grow a calcium carbonate having an intended BET specific surface area and/or an intended average particle size.

The calcium carbonate produced by crystal growth in the embodiment is a synthetic calcium carbonate. As described above, calcium carbonate has crystalline polymorphs including calcite crystals (trigonal rhombohedral crystals), aragonite crystals (orthorhombic crystals), and vaterite crystals (hexagonal crystals), and the calcium carbonate produced in the embodiment preferably has the calcite structure. The calcite crystal is the form of a crystal typically produced as calcite and is most stable at normal temperature and pressure as compared with the other crystal forms. The calcium carbonate produced in the embodiment preferably has the calcite structure and a BET specific surface area of 2 to 50 $m^2/g$. The BET specific surface area can be determined as follows: gas molecules (such as nitrogen molecules) having a known adsorbate occupied area are allowed to adsorb to a substance; and the adsorption amount is calculated. The BET specific surface area of a calcium carbonate can be determined in accordance with "Determination of the specific surface area of powders (solids) by gas adsorption-BET method" in JIS Z 8830 (corresponding to ISO 9277:2010). The calcium carbonate produced in the embodiment preferably has a BET specific surface area of 2 to 50 $m^2/g$, more preferably 5 to 45 $m^2/g$, and even more preferably 20 to 45 $m^2/g$. The calcium carbonate produced by the method in the embodiment preferably has a number-based average particle size of 30 nm to 1.0 μm as determined by electron microscopy. To determine particle sizes, some methods are known. In the present embodiment, particles are directly observed and measured under an electron microscope, and an average particle size is calculated from a number-based particle size distribution. In the embodiment, a calcium carbonate having an average particle size of 30 nm to 1.0 μm means that the calcium carbonate mainly comprises calcium carbonate particles having nano-order particle sizes. The calcium carbonate in the embodiment preferably has an average particle size of 40 to 500 nm and more preferably 50 to 100 nm.

The calcium carbonate produced by crystal growth in the embodiment may partially comprise substantially ring-like particles. In the present description, the ring-like shape generally means a shape having a single pore (ring) and a shape having a cavity (hollow) and includes not only a circular shape and a ring shape but also polygonal shapes, such as a triangular shape and a quadrangular shape, each having a single pore or a cavity and a tubular shape. In the present description, the substantially ring-like shape includes not only a completely continuous ring-like shape but also an incompletely continuous ring-like shape such as a C shape. The calcium carbonate in the embodiment may partially comprise substantially ring-like particles. The substantially ring-like calcium carbonate has a size of about 10 to 150 nm. The substantially ring-like particles of calcium carbonate are formed due to the production process of calcium carbonate described later. The calcium carbonate in the embodiment may comprise, in addition to the substantially ring-like particles, particles having spherical, substantially cubic, substantially rectangular parallelepiped, substantially rhombohedral, spindle, acicular, and other shapes. The calcium carbonate in the embodiment may also comprise partially concave particles having spherical, substantially rectangular parallelepiped, and other shapes, or a shape having an incomplete pore, for example.

The calcium carbonate produced by crystal growth in the embodiment may be surface-treated with a surface treatment agent selected from the group consisting of a fatty acid and derivatives thereof, a resin acid and derivatives thereof, silica, an organic silicon compound, a condensed phosphoric acid, and a condensed phosphate. Examples of the fatty acid include lower fatty acids such as acetic acid and butyric acid and higher fatty acids such as palmitic acid, stearic acid, oleic acid, linoleic acid, linolenic acid, arachidonic acid, eicosapentaenoic acid, and docosahexaenoic acid. Examples of the resin acid include acids derived from resins, such as abietic acid, neoabietic acid, palustric acid, pimaric acid, isopimaric acid, and dehydroabietic acid. Silica is a compound (silicon dioxide) represented by the composition formula, $SiO_2$. Examples of the organic silicon compound include a silane coupling agent in which a functional group (such as a vinyl group, an epoxy group, an amino group, a methacryl group, and a mercapto group) bonded to an organic material is bonded through a silicon atom (Si) to a functional group (such as a methoxy group and an ethoxy group) bonded to an inorganic material in a molecule. Examples of the condensed phosphoric acid include an inorganic polymer compound prepared by heating dehydration of orthophosphoric acid. These surface treatment agents may be used singly or in combination of two or more of them.

The calcium carbonate produced in the first embodiment of the present invention and the calcium carbonate in the second embodiment are mixed with a resin or the like to produce a resin composition. Calcium carbonate has a smaller specific gravity than conventionally used inorganic fillers such as barium sulfate and titanium oxide. Accordingly, using calcium carbonate as an inorganic filler can reduce the weight of a resin composition. The resin is preferably selected from the group consisting of elastomer resins and mixtures thereof, such as a polyolefin resin, a polyester resin composition, a polyarylate resin composition, and various diene resins. Elastomer resins such as a polyolefin resin, a polyester resin, a polyarylate resin, and a diene resin can be used singly or in combination of two or more of them. As long as the object of the present invention is not impaired, the composition can also comprise a resin other than elastomer resins such as a polyolefin resin, a polyester resin, a polyarylate resin, and a diene resin and mixtures thereof, as needed.

The polyolefin resin is a homopolymer and a copolymer prepared by polymerizing an olefin (alkene) or a cyclic olefin monomer and a mixture thereof. Examples of the polyolefin resin include polyethylene, polypropylene, poly (4-methylpentene-1), polybutene-1, poly(1-hexene), ethylene-tetracyclododecene copolymer, and polyacetal. The polyester resin is a polyester of a polycondensation product of a polyvalent carboxylic acid and a polyol and mixtures thereof. As the polyester resin, an aromatic polyester resin is preferably used. Examples of the aromatic polyester resin include polytrimethylate terephthalate resin (PTT), polyethylene terephthalate resin (PET), polypropylene terephthalate resin, polybutylene terephthalate resin (PBT), polyethylene naphthalate resin (PEN), polybutylene naphthalate resin (PBN), and poly(cyclohexane-1,4-dimethylene-terephthalate) resin. Examples further include alkylene terephthalate copolymers containing an alkylene terephthalate building block as the main building block and polyalkylene terephthalate mixtures containing polyalkylene terephthalate as the main component. A mixture or a copolymer containing an elastomer component such as polyoxytetramethylene glycol (PTMG) may also be used. Examples of the polyalkylene terephthalate mixture include a mixture of PBT with a polyalkylene terephthalate other than PBT and a mixture of PBT with an alkylene terephthalate copolyester other than PBT. Of them, a mixture of PBT with PET, a mixture of PBT with polytrimethylene terephthalate, a mixture of PBT with PBT/polyalkylene isophthalate, and the like are preferred. Examples of the diene elastomer resin include rubber materials prepared by polymerizing a diene monomer, such as polybutadiene, polyisoprene, and polychloroprene. Elastomer resins such as urethane rubber, silicone rubber, and fluororubber may also be used.

When used as a filler, the calcium carbonate in the second embodiment is most preferably used singly but may be used as a mixture with a conventionally used inorganic filler such as barium sulfate, titanium oxide, and talc, as needed. A resin composition comprising the calcium carbonate in the embodiment can contain common additives such as an antioxidant, a heat stabilizer, an ultraviolet absorber, a fibrous reinforcement, a lubricant, a flame retardant, an antistatic agent, a coloring agent, and a pigment. The content of these additives is preferably 10% by mass or less of the resin composition.

As described above, the calcium carbonate produced in the first embodiment, the calcium carbonate in the second embodiment, and the calcium carbonate produced in the third embodiment may partially comprise substantially ring-like particles. The calcium carbonate comprising substantially ring-like particles can be used directly, or the substantially ring-like particles can be selectively separated. To separate the substantially ring-like particles, for example, the calcium carbonate can be sieved to collect calcium carbonate particles having particle sizes in a particular range, and only the substantially ring-like particles can be separated by observation under a microscope.

As described above, the calcium carbonate produced in the first embodiment, the calcium carbonate in the second embodiment, and the calcium carbonate produced in the third embodiment can be mixed with various resins and be used as a resin composition. The calcium carbonate can be used as an inorganic filler for resins and can also be used as a loading material for paper, paints, inks, and the like. The calcium carbonate can also be used as a filler for foods, cosmetics, and the like. The substantially ring-like calcium carbonate prepared by separation should be used, for example, as a mold for another nanomaterial, a drug carrier, a catalyst support, or a lightweight filler, by using its special shape.

EXAMPLES

Examples of the present invention will next be specifically described. Without departing from the scope, the present invention is not limited to the following examples.

Example 1: Production of Calcium Carbonate According to Present Invention

Preparation of Aqueous Calcium Carbonate Dispersion

In a 1-liter beaker, 10 g of an aqueous dispersion of a calcium carbonate having a solid content of 10% by weight, having a BET specific surface area of 39.1 $m^2$/g (JIS Z 8830, corresponding to ISO 9277:8830) and having a number-based average particle size of 38 nm as determined by electron microscopy was prepared.

Addition of Carbonated Water to Aqueous Calcium Carbonate Dispersion

While 10 g of the prepared aqueous calcium carbonate dispersion was gently stirred under atmospheric pressure at room temperature (25° C.), 490 g of carbonated water was added, and the pH of the aqueous calcium carbonate dispersion was reduced to 6.2.

Increase in pH of Aqueous Calcium Carbonate Dispersion

While the resulting aqueous calcium carbonate dispersion was gently stirred, the beaker was allowed to stand. As the stirring was continued for 60 minutes, the pH of the aqueous calcium carbonate dispersion was increased to 7.0.

Treatment of Collected Sample

A sample collected from the aqueous calcium carbonate dispersion was immediately washed with ethanol to stop the crystal growth and was filtered under reduced pressure. The product was dried under vacuum to give a white calcium carbonate powder (having a BET specific surface area of 22.1 $m^2$/g as determined in accordance with JIS Z 8830, corresponding to ISO 9277:2010, and a crystallite size of 53 nm). The collected calcium carbonate was dispersed in ethanol, and the dispersion was dropped on a copper grid with a carbon-reinforced collodion support membrane. The ethanol was evaporated, and the residue was vacuum-dried, giving a sample for transmission electron microscopy (TEM). The sample was observed under an electron microscope (apparatus name: JEOL JEM-2100) (Example 1-1).

The procedure in Example 1 was performed except that 190 g of carbonated water was added to the aqueous calcium carbonate dispersion (Example 1-2), giving a calcium carbonate having a BET specific surface area of 30.2 $m^2$/g and a crystallite size 45 nm.

The procedure in Example 1 was performed except that 40 g of carbonated water was added to the aqueous calcium carbonate dispersion (Example 1-3), giving a calcium carbonate having a BET specific surface area of 36.8 $m^2$/g and a crystallite size of 40 nm.

FIG. 1-*a* and FIG. 1-*b* are electron micrographs of the starting material calcium carbonate. FIG. 1-*a* is a micrograph at a magnification of 40,000 times, and FIG. 1-*b* is a micrograph at a magnification of 200,000 times. FIG. 2-*a* and FIG. 2-*b* are electron micrographs of the calcium carbonate produced in Example 1-1. FIG. 2-*a* is a micrograph at a magnification of 40,000 times, and FIG. 2-*b* is a micrograph at a magnification of 200,000 times. In each micrograph, the scale bar has a length of 200 nm (FIG. 1-*a*), 50 nm (FIG. 1-*b*), 200 nm (FIG. 2-*a*), or 50 nm (FIG. 2-*b*). In FIG. 2-*a* and FIG. 2-*b*, the calcium carbonate comprises rhombohedral particles about 70 nm in size. In the production method of the present invention, the calcium carbonate having been dissolved supposedly grew along the {104} plane of crystals into rhombohedral particles. In Examples 1-2 and 1-3, crystal growth of calcium carbonate was also promoted. By considering the balance between the amount of an aqueous calcium carbonate dispersion and the amount of an acidic substance to be added, a calcium carbonate comprising particles having an intended size and an intended shape can be produced. The crystallite size determined in Example 1 is a crystallite size determined by using X-ray diffractometry. The crystallite size determined by X-ray diffractometry is known to be substantially the same as the number-based average particle size determined by electron microscopy at least less than about 100 nm.

Example 2: Crystal Growth from Material Calcium Carbonates Having Different Sizes The procedure in Example 1-1 was performed except that a calcium carbonate having a BET specific surface area of 18.4 $m^2/g$ (Example 2-1), 15.3 $m^2/g$ (Example 2-2), or 10.9 $m^2/g$ (Example 2-3) (determined in accordance with JIS Z 8830, corresponding to ISO 9277:2010) was used in the aqueous calcium carbonate dispersion. The crystal growth of the calcium carbonate was stopped in a similar manner to that in Example 1-1, and the product was filtered under reduced pressure and dried under vacuum, giving a white calcium carbonate in the solid state. The BET specific surface areas of these calcium carbonates were determined in accordance with JIS Z 8830 (corresponding to ISO 9277:2010) to be 10.8 $m^2/g$, 8.3 $m^2/g$, and 7.5 $m^2/g$. The crystals of each calcium carbonate produced in Examples 2-1, 2-2, and 2-3 comprised rhombohedral particles. As a typical example, an electron micrograph of the calcium carbonate produced in Example 2-2 is shown in FIG. 3 (magnified 20,000 times, the scale bar has a length of 500 nm).

Figure 4:
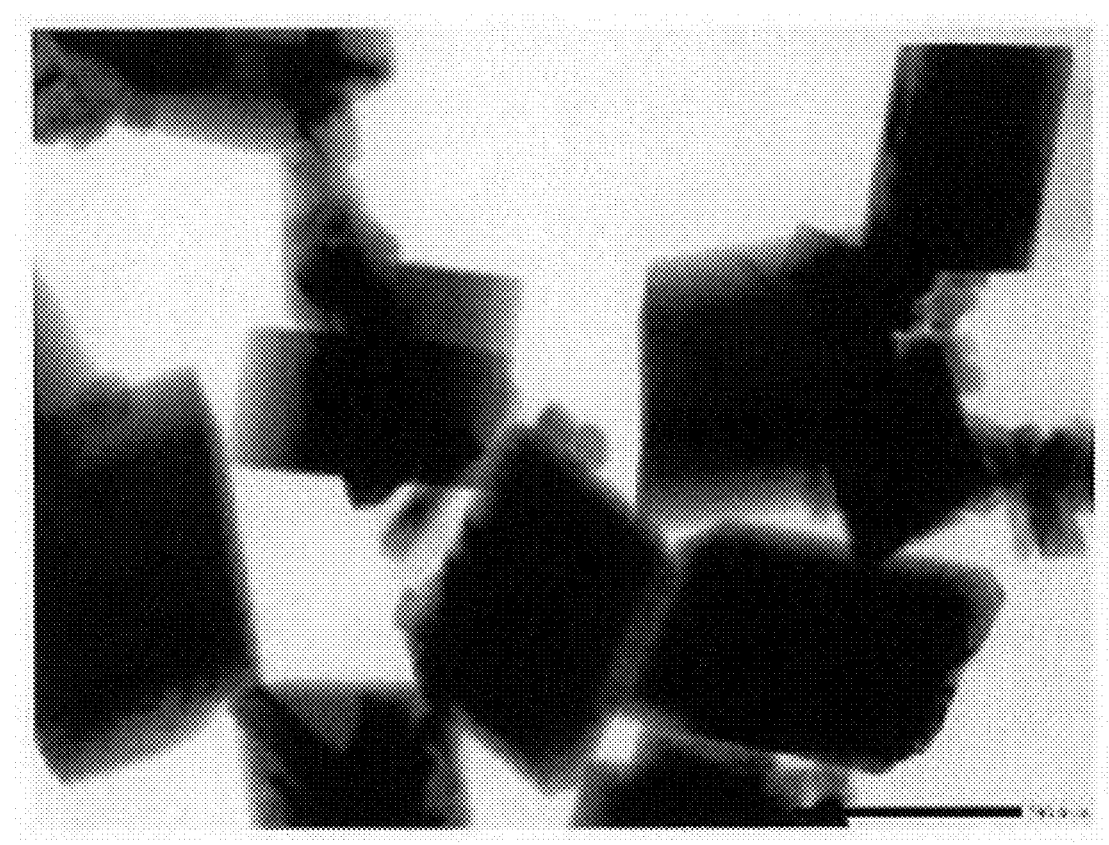
FIG. 4 is an electron micrograph (magnified 20,000 times) of a calcium carbonate produced in Example 3.

Example 3: Crystal Growth of Calcium Carbonate by Repeating pH Reduction and pH Increase The calcium carbonate (having a BET specific surface area of 8.3 $m^2/g$) produced in Example 2-2 from a calcium carbonate having a BET specific surface area of 15.3 $m^2/g$ as the starting material was re-dispersed in water in a similar manner to that in Example 1-1, giving an aqueous calcium carbonate dispersion. To 10 g of the aqueous calcium carbonate dispersion, 490 g of carbonated water was added in a similar manner to that in Example 1-1. Next, crystals were grown while the aqueous calcium carbonate dispersion was gently stirred. In this manner, pH reduction and pH increase of the aqueous calcium carbonate dispersion were alternately repeated twice, giving a calcium carbonate having a BET specific surface area of 6.1 $m^2/g$ (Example 3). FIG. 3 is an electron micrograph of the calcium carbonate produced in Example 2-2 (magnified 20,000 times). FIG. 4 is an electron micrograph of the calcium carbonate produced in Example 3 (magnified 20,000 times). The scale bar in each photograph has a length of 500 nm. By repeating pH reduction and pH increase of the aqueous calcium carbonate dispersion to facilitate crystal growth of the calcium carbonate, large rhombohedral crystals were produced.

Example 4: pH Reduction by Addition of Diluted Hydrochloric Acid

Figure 5:
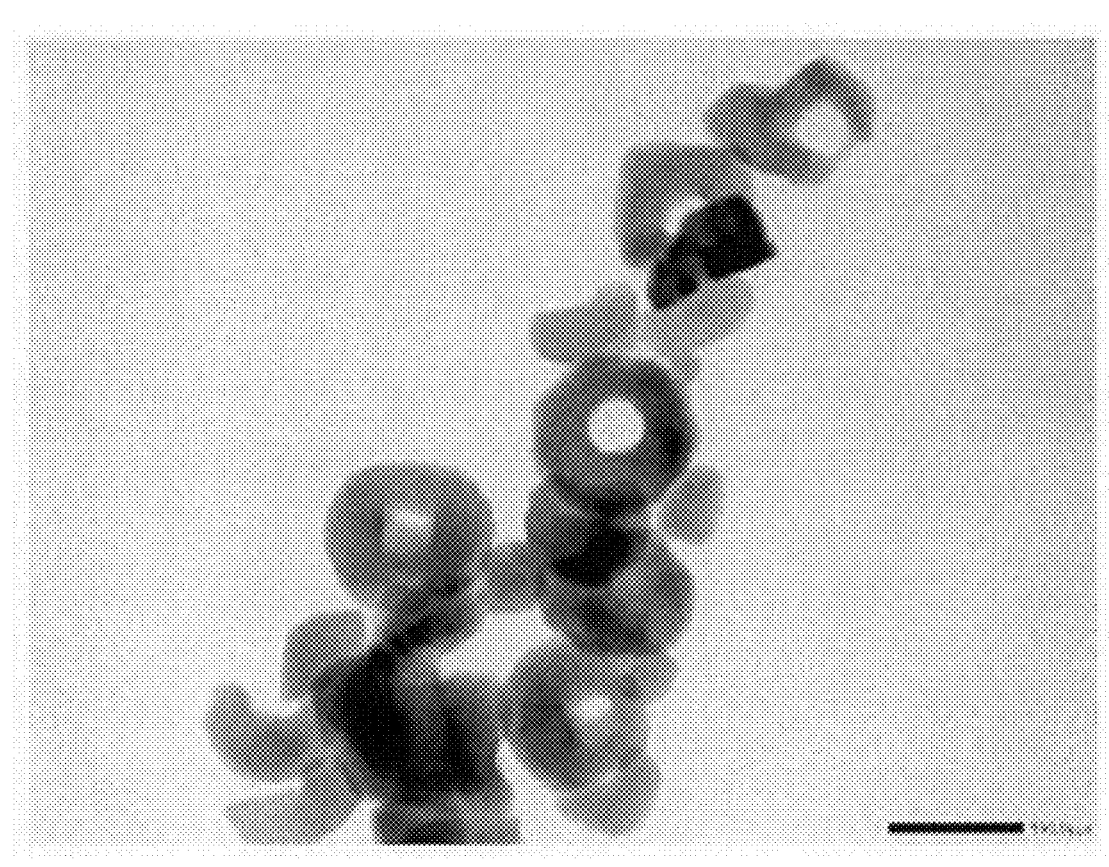
FIG. 5 is an electron micrograph (magnified 80,000 times) of a calcium carbonate produced in Example 4.

The procedure in Example 1-1 was performed except that 3 mL of diluted hydrochloric acid (having a concentration of 1 mol/L) was added in place of 490 g of carbonated water in Example 1-1. The BET specific surface area of the calcium carbonate produced in Example 4 was determined in accordance with JIS Z 8830 (corresponding to ISO 9277:2010) to be 21.3 $m^2/g$. FIG. 5 is an electron micrograph of the calcium carbonate produced in Example 4 (magnified 80,000). The scale bar in the micrograph has a length of 100 nm. The calcium carbonate produced in Example 4 comprised substantially ring-like crystals about 100 nm in size.

What is claimed is:

1. A method for producing calcium carbonate having the calcite structure, having a BET specific surface area of 2 to 50 $m^2/g$, and having a number-based average particle size of 30 nm to 1.0 μm as determined by electron microscopy, the method comprising at least a step of facilitating growth of calcium carbonate crystals from an aqueous calcium carbonate dispersion, the step of facilitating growth of calcium carbonate crystals comprising:

reducing a pH of the aqueous calcium carbonate dispersion to 6.2 or less and 5.5 or more by adding carbonated water at atmospheric pressure; and then allowing calcium carbonate particles to grow and then increasing the pH above 6.2 of the aqueous calcium carbonate dispersion.

2. The production method according to claim 1, wherein the reducing the pH of the aqueous calcium carbonate dispersion to 6.2 or less and 5.5 or more and the increasing the pH of the aqueous calcium carbonate dispersion are repeated.

3. The production method according to claim 1, wherein increasing the pH of the aqueous calcium carbonate dispersion is performed by a method selected from the group consisting of allowing the aqueous calcium carbonate dispersion to stand, stirring the aqueous calcium carbonate dispersion, depressurizing the aqueous calcium carbonate dispersion, heating the aqueous calcium carbonate dispersion, and adding a basic substance to the aqueous calcium carbonate dispersion.

4. A method for producing calcium carbonate having the calcite structure, having a BET specific surface area of 2 to 50 $m^2/g$, and having a number-based average particle size of 30 nm to 1.0 μm as determined by electron microscopy, the method comprising at least a step of facilitating growth of calcium carbonate crystals from an aqueous calcium carbonate dispersion, the step of facilitating growth of calcium carbonate crystals comprising:

reducing a pH of the aqueous calcium carbonate dispersion to 9.0 or less and 5.5 or more by performing following a. or b.:

a. adding an acidic substance selected from the group consisting of hydrochloric acid, sulfuric acid, hydrobromic acid, boric acid, benzenesulfonic acid, acetic acid, citric acid, tartaric acid, and ascorbic acid at atmospheric pressure, or b. adding an acidic substance at higher than the atmospheric pressure and less than 10 atm; and then increasing the pH of the aqueous calcium carbonate dispersion to grow calcium carbonate particles.

5. The production method according to claim 4, wherein increasing the pH of the aqueous calcium carbonate dispersion is performed by a method selected from the group consisting of allowing the aqueous calcium carbonate dispersion to stand, stirring the aqueous calcium carbonate dispersion, depressurizing the aqueous calcium carbonate dispersion, heating the aqueous calcium carbonate dispersion, and adding a basic substance to the aqueous calcium carbonate dispersion.

6. The production method according to claim 4, wherein the reducing the pH of the aqueous calcium carbonate dispersion to 9.0 or less and 5.5 or more and the increasing the pH of the aqueous calcium carbonate dispersion are repeated.

* * * * *